(12) United States Patent
Lloyd et al.

(10) Patent No.: US 8,572,478 B2
(45) Date of Patent: Oct. 29, 2013

(54) ROW HEIGHTS IN ELECTRONIC DOCUMENTS

(75) Inventors: Zachary Lloyd, Brooklyn, NY (US); Nick Santos, Brooklyn, NY (US)

(73) Assignee: Google Inc., Mountain View, CA (US)

(*) Notice: Subject to any disclaimer, the term of this patent is extended or adjusted under 35 U.S.C. 154(b) by 23 days.

(21) Appl. No.: 13/085,342

(22) Filed: Apr. 12, 2011

(65) Prior Publication Data

US 2011/0252300 A1 Oct. 13, 2011

Related U.S. Application Data

(60) Provisional application No. 61/323,260, filed on Apr. 12, 2010.

(51) Int. Cl.
*G06F 17/00* (2006.01)

(52) U.S. Cl.
USPC .......................... 715/234; 715/212

(58) Field of Classification Search
USPC ......................... 715/212, 200, 234
See application file for complete search history.

(56) References Cited

U.S. PATENT DOCUMENTS

| | | | |
|---|---|---|---|
| 5,450,536 A | 9/1995 | Rosenberg et al. | |
| 6,675,351 B1 | 1/2004 | Leduc | |
| 6,988,241 B1 * | 1/2006 | Guttman et al. | 715/220 |
| 7,017,112 B2 * | 3/2006 | Collie et al. | 715/212 |
| 7,213,199 B2 * | 5/2007 | Humenansky et al. | 715/209 |
| 7,506,242 B2 * | 3/2009 | Kotler et al. | 715/209 |
| 2003/0014406 A1 * | 1/2003 | Faieta et al. | 707/5 |
| 2005/0273695 A1 * | 12/2005 | Schnurr | 715/503 |
| 2008/0040672 A1 | 2/2008 | Appleyard et al. | |
| 2010/0205520 A1 | 8/2010 | Parish et al. | |
| 2011/0252335 A1 * | 10/2011 | Lloyd et al. | 715/744 |
| 2012/0117452 A1 * | 5/2012 | Lloyd et al. | 715/212 |

FOREIGN PATENT DOCUMENTS

WO 01/44983 6/2001

OTHER PUBLICATIONS

International Search Report & Written Opinion for Application No. PCT/US2011/032135, dated Jun. 22, 2011, 10 pages.

* cited by examiner

*Primary Examiner* — Manglesh M Patel
(74) *Attorney, Agent, or Firm* — Wolff & Samson, PC

(57) ABSTRACT

A computer-implemented method for managing row height in an electronic document includes receiving, at a computing device, a request to display a portion of a document that defines a plurality of rows of content and that is represented by a document model; determining heights of the plurality of rows and saving information about the determined heights in a cache that correlates rows to the height information; and using the document model and the cache to generate a view of the document model having the determined row heights.

18 Claims, 6 Drawing Sheets

ROW HEIGHTS IN ELECTRONIC DOCUMENTS

CROSS-REFERENCE TO RELATED APPLICATIONS

This application claims priority to U.S. Provisional Application Ser. No. 61/323,260, filed on Apr. 12, 2010, entitled "Row Heights in Electronic Documents," the entire contents of which are hereby incorporated by reference.

TECHNICAL FIELD

This document relates to systems and techniques for managing row heights and the display of row heights in electronic documents such as spreadsheets.

BACKGROUND

Electronic spreadsheets—made up of a grid of cells having rows and columns—are powerful tools that enable tracking and manipulation of large amounts of organized financial, engineering, and other information. Spreadsheets can enable a user to establish formulas and other relationships between and among the cells that make up the spreadsheet so as to compute a variety of values. The content of a spreadsheet can be viewed (e.g., on screen or printed) in place, in the spreadsheet grid itself (as opposed to standard databases which may need to be run through a reporting structure in order to produce meaningful output). To make such output more meaningful and visually appealing, spreadsheet applications permit users to apply formatting to text, numbers and other values in a cell (e.g., selecting a number of significant digits to display after a decimal point, a font type and size, and the like).

A user may also be able to select the width of the columns in a spreadsheet, so that the user can make the relevant columns fit on a single screen or page when they review the spreadsheet. In certain circumstances, the content in a cell will not fit, because the content is too large, and the width of the column is too narrow. In such a situation, a user may be provided the option to format a column so that content such as text "wraps" at the right edge of the column and starts another row of text within the particular cell. As a result, the height of the cell will need to increase if all the content is to be seen, and the height of all the cells in the row will need of increase an equal amount if the alignment of the grid is to be maintained.

SUMMARY

This document describes systems and techniques that may be used to manage row height in an electronic document such as a spreadsheet. Particular implementations here relate to spreadsheets in cloud-based, or hosted, systems, where a spreadsheet model is stored at a central server system and then is rendered and displayed using web browsers one or more client computing devices that are physically remote from the server system. Such an implementation may use a model-view-controller approach to managing interaction with a document, where a model of a document may be stored at the central server system, and all or a portion of the model data may be downloaded to a client device (or multiple client devices if multiple users are editing or reviewing the document at the same time). The model may be rendered to produce a view, and user interaction with the view may be tracked by a controller that causes the view to change, and information to be uploaded to or downloaded from the central server system. Only a portion of the document may be capable of being displayed to a user at once—the current viewport—and the client may render the model for that portion, and perhaps for a buffer area around the viewport. Such rendering may include generating a DOM from the model, where the DOM can be accessed and displayed by the browser.

Identification of proper row heights can be a challenge because only a small portion of the model may be represented in the DOM at any time, and a determination of cell height may, as a practical matter, require actually rendering a cell, and a determination of row height, by extension, may require rendering all the cells in a row and selecting the max. Thus, as described here, full rows (or even full models) may be rendered from time to time, and the determined heights of the rows may be stored in a cache that is consulted to determine appropriate row heights when data needs to be provided to the DOM for generating an updated view. When changes that may affect row height are made to cells (e.g., changes determined to be other than mere cosmetic changes such as changing a cell color), rows that may be affected by the change (e.g., rows that include cells that have formulas that reference the changed cell) may be marked in the cache as "dirty," meaning that the system will assume that the cache height for the row may be inaccurate. Then, if a dirty row needs to be rendered later, it can be rendered when the row falls within the range of the buffered view, and it may then be marked clean again.

Other features may also be employed to improve performance of such a system. For example, when computing row heights, cells that do not contain content can be skipped and not rendered. Also, determines may be made that a cell contains less content than another cell, so that its rendering can be skipped in such a situation. Also, the HTML for rendered cells may also be cached, and its validity may also be tracked, so that invalid or dirty HTML can be regenerated when it is needed. Also, row heights can be measured in batch processes (e.g., measuring the heights of multiple rows at a time), to avoid the browser having to perform multiple unnecessary layouts on each row measurement. Also, the row height cache may be stored locally on a device in a manner that it can be used between sessions—i.e., if a new session starts and the system determines that no changes have been made to a document since a prior session, the previously-stored cache may be used.

Such features may, in certain implementations, provide one or more advantages. For example, a browser-based spreadsheet may be displayed with cells that are properly laid out to incorporate text wrapping. Also, such a determination may be made even though a user may be looking at only a small part of a spreadsheet, so that when the user starts scrolling through the spreadsheet, the row heights shown to the user do not change, and the integrity of the spreadsheet grid may be maintained. As a result, the visual impression a user receives when navigating a browser-based spreadsheet may be substantially improved.

In one implementation, a computer-implemented method for managing row height in an electronic document is disclosed. The method includes receiving, at a computing device, a request to display a portion of a document that defines a plurality of rows of content and that is represented by a document model; determining heights of the plurality of rows and saving information about the determined heights in a cache that correlates rows to the height information; and using the document model and the cache to generate a view of the document model having the determined row heights. The request to display a portion of the document can comprise a scrolling input form a user viewing the document, and further comprising determining a view area around a current viewport being displayed to the user. At least part of the view area can differ from a prior view area for the document. Also, the document can comprise a spreadsheet made up of cells, and wherein determining the heights of the plurality of rows comprises iteratively rendering cells across rows in the spreadsheet and storing a maximum determined cell height for each row in the cache.

In some aspects, determining heights of the plurality of rows comprises rendering cells in a manner that is not readily visible to a viewer of the spreadsheet, and determining the rendered heights of the cells. The method may further include skipping rendering of cells that are determined to be empty cells. The method can further include determining that changes have been made in the document, identifying one or more rows whose height could be affected by the changes, and marking the identified rows in the cache as dirty, without immediately making a new determination of the heights of the dirty rows. Moreover, the method can include, after multiple instances of determining that changes have been made in the document, and associated marking of identified rows as dirty, identifying a batch of dirty rows, determining heights for each of the identified rows, and recording the determined heights in the cache for the identified rows. And the method can also include saving information from the cache in a local storage that persists across sessions in a web-based application for interacting with the document.

In another implementation, a computer-implemented system for managing row height in an electronic document is disclosed. The system can include a document model that defines a document having a plurality of rows of data; a row height measurement module that includes a document renderer for rendering portions of the content in individual rows of the document, and a row height determination module to identify a row height for the rendered portions; and a row height cache arranged to store values of row heights for the rows in the document generated by the row height measurement module, for use in rendering portions of the document to a browser-based application.

In yet another implementation, a computer-implemented system for managing row height in an electronic document comprises a document model that defines a document having a plurality of rows of data; means for determining heights of rows in the document; and means for using the determined heights to rendering portions of the document to a browser-based application.

The details of one or more embodiments are set forth in the accompanying drawings and the description below. Other features and advantages will be apparent from the description and drawings, and from the claims.

DESCRIPTION OF DRAWINGS

Like reference symbols in the various drawings indicate like elements.

DETAILED DESCRIPTION

This document describes systems and techniques for managing row heights in an electronic document such as a spreadsheet that is composed of a grid having rows and columns. Generally, the user experience with a spreadsheet is maximized if each of the rows maintains a consistent height while a user moves back-and-forth in the spreadsheet. However, sometimes a cell that contains additional content compared to other cells, and thus may word wrap so that it requires more height to be fully displayed, may not be in an area in which a user is currently viewing the spreadsheet (i.e., in a current viewport plus buffer area). As a result, it may be a challenge to determine the appropriate height for various rows without processing every cell in the spreadsheet.

As described here, the height of each cell in a row, and by extension the height of the row, can be determined for each row at an appropriate time, and then can be cached so that it can be reused quickly if the height has not changed in the intervening time frame. A tracking status for each row can be maintained to determine whether the height of a row may have change—though simply by determining whether a change to content in the spreadsheet could have resulted in a change in height for a cell in the row, but without actually determining whether it did. If the row never needs to be displayed again, the effort to determine the row height may be conserved, while if the row does need to be displayed, its height can be recomputed at that time. Also, re-computation of the height of "dirty" rows may occur in the background when a computer has spare processing capacity.

Figure 1:
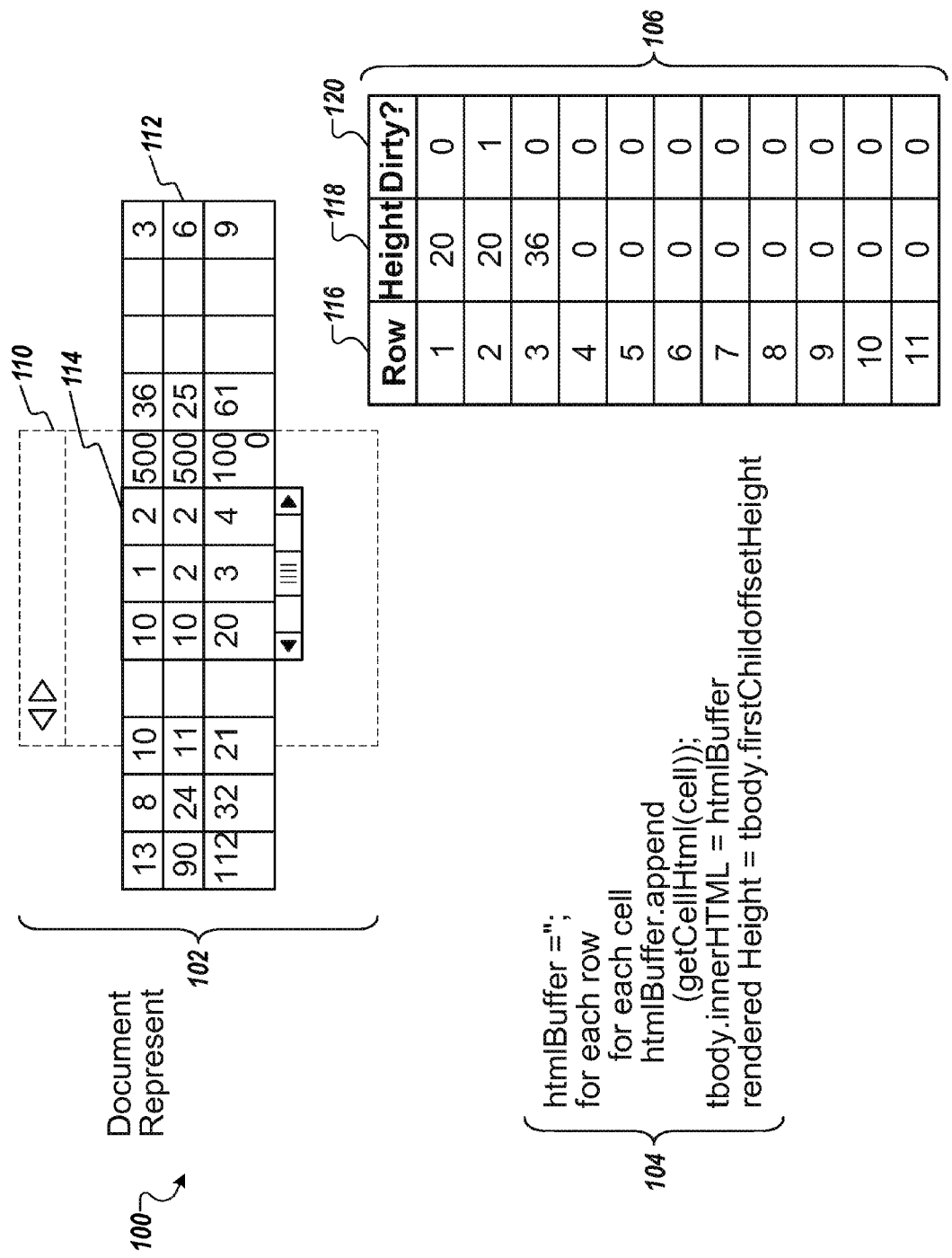
FIG. 1 is a conceptual diagram for determination of row heights in a browser-based spreadsheet application.

FIG. 1 is a conceptual diagram for determination of row heights in a browser-based spreadsheet application. In the example shown here, a system 100 is made up of a number of components that cooperate to display a spreadsheet 112 so that its rows have a proper displayed height, so that all of the text from every cell is displayed completely (though a maximum height may be imposed, and additional content may be hidden when a cell exceeds the maximum height).

One such component is a document representation 102 that shows a number of aspects for conceptualizing a spreadsheet 112 that is managed by an electronic document management system. The spreadsheet 112 is shown here in a conceptual form as having twelve columns and three rows. Each of the cells in the spreadsheet 112 (i.e., the intersection of a cell and a row) is formatted to contain an integer number in this example, though in actual implementations, the cells could take a variety of forms and could hold text, floating-point numbers, formulas, URLs, or other similar content.

In this example, the third row of the spreadsheet 112 is shown as being the sum of the first two rows. A center portion of the spreadsheet 112 is shown as being displayed in a viewport 114 in a Web browser 110. The viewport 114 is shown here as been overlaid on the spreadsheet 112, to indicate conceptually that it acts like a window through the page of the browser 110 can provide a user with a view of a small portion of the spreadsheet 112. The viewport 114 is necessary because the spreadsheet 112 is too large to be displayed at a reasonable zoom level in its entirety on the browser 110 at one time.

Certain controls and other chrome may be provided with the spreadsheet 112 as displayed on the browser 110, such as controls for entering and editing content in the spreadsheet 112 using the browser 110. However, for clarity, most such controls have been omitted in this figure. One control, in the form of a scrollbar located at the bottom of viewport 114, may be used in a familiar manner by a viewer of the spreadsheet 112 in order to navigate through the spreadsheet 112 via the viewport 114. In particular, a handle is shown in the scrollbar, and a user may grab the handle and move it left or right to move the spreadsheet right or left through the viewport 114. Thus, for example, if the user slides the handle all the way to the right of the scrollbar area, they will be shown the right-hand end of the spreadsheet 112, after the spreadsheet has been slid to the left in the figure here (though if the scrolling motion is fast enough, the viewport may jump from one area to a distant area, without rendering or displaying any cells in between).

The spreadsheet 112 may be stored in the form of a data model that can be accessed from a hosted server system by a client that is running the browser 110. The client may download the entire model, or only a portion of the model, such as when the model is extremely large, i.e., thousands of rows and or columns. The information shown in viewport 114 may be just a small subset of the model, in the form of a rendered version of the model content. For example, the model may include formulas and other complex content, and that content may be reduced (e.g., to static HTML text values) for use in the viewport 114. Such data may be rendered to a document object model (DOM) on the client device, and may be accessed from the DOM for display by the browser 110 in familiar manners.

So that the rendering of a new viewport DOM need not occur every time a user moves a small amount through the spreadsheet 112, a buffer area of a predetermined number of columns and/or rows may be maintained in the DOM for the area around the viewport 114. The spreadsheet 112 may be rendered in the DOM using a basic table element that may be manipulated directly by the browser 110. Thus, if a user scrolls only a handful of rows or columns away from an existing viewport 114, the new rows or columns may be taken directly from the DOM by the browser 110, and displayed to the user. If, however, the user begins scrolling very quickly or scrolls a long distance, additional code from the downloaded model may be rendered and provided to an updated version of the DOM, so that the new area can be displayed in the viewport 114.

Relevant to the feature of determining appropriate row heights for displaying the spreadsheet 112, for each of the three columns in the viewport 114, the content requires only one line for the third row. However, there is a column to the right of the viewport 114 that requires two lines to display the content of its third-row cell. Thus, if only the cells inside the viewport 114 at the current time were considered in determining proper row height, then a single-line row would be shown for the third row here, and when a user scrolled to the right one column, the height of that row would suddenly jump to being a two-line row. Also, labels may be displayed in a viewport or to the sides of the viewport as chrome (e.g., numbers for rows and letters for columns), and the heights of those labels may be improperly sized either when the third row is a one-line height or when the third row is a two-line height.

Thus, to prevent such anomalies from occurring, the system 100 may use algorithm 104 to, in advance, determine a height for each cell in a row, and by extension, determine the height for each row (which would be the max of the cell heights for that row, up to a defined maximum possible height imposed by the user or as a default maximum height by the system). In particular, and as shown, a nested process may be performed to step through, first, each cell in a row, and outside of that cycle, to step through each row in a range within the spreadsheet 112. Such a computation may be performed across the entire spreadsheet or simply for rows that are in a current viewport and above or below the viewport by a certain buffer amount. This algorithm 104 may be repeated each time that one or more rows or a group of rows needs to have its height recalculated.

Although the computation just described may allow navigation freely through the spreadsheet 112 for a short time period, the status of the spreadsheet 112 may quickly change as a user edits the content in the cells of the spreadsheet 112. For example, a user may enter a very large number in one of the cells in rows one or two of spreadsheet 112, and thereby force a cell in row three to have a three-line height. The first round of computations for row height however, will show row three as having only a two-line height in such a situation. The system 100 may, in such situations, re-compute the row height of any row that may have been affected by an edit. For example, all dependencies between cells in a model of the spreadsheet 112 may be checked moving downstream through numerous branches, and any cell determined to have been affected by an input in one of the branches may have its entire row height recomputed, or at least the height of the affected cell recomputed and inserted as with the new height for the row if it exceeds the prior height for the row. However, such computation may be wasteful if a user makes numerous changes to various cells before navigating a long distance in the spreadsheet 112. For example, in the simple spreadsheet 112 shown here, a user might first edit in two medium sized numbers in the first two rows that would require a three-line height cell in the third row. Without navigating far from that location, the user may make another edit to some other cells that would require the third row to have four-line height. In such a situation, it would be wasteful to re-compute the height of the row both times when the user has not even moved.

Alternatively, the height of all rows may be recomputed whenever a user moves a substantial distance in the spreadsheet 112. However, such re-computation may be wasteful in that it addresses (and would involve rendering of) cells and rows that have not changed since the last re-computation.

Thus, as shown in FIG. 1, a table 106 may be provided to track possible changes in row heights in an efficient manner. In this example, for simplicity, the table 106 is shown as having three columns that relate to each other. The first column represents the particular row in the spreadsheet. In this example rows one, two, and three are relevant because they are the only portion of spreadsheet 112 that is addressed here. Column 118 shows the heights computed for particular rows. In this example, a one-line row is indicated as having a height of 20, and a two-line height row is indicated as having a height of 36. The fact that the two-line row is not twice as high as a one-line height row may indicate that each row has a certain amount of buffer space above and below it to separate it from the next rows (e.g., a couple pixels). The particular units by which the height is to be measured may take various forms, including a number of pixels (or the pixels number may be used as a base when the user has zoomed the browser). Other measures of height may also be used as appropriate.

To generate the measures of height, each cell in the spreadsheet 112, when passed through the algorithm 104, may be rendered to a hidden portion of a browser, such as by using a span element in a hidden iFrame, and inserting the HTML for the particular cell into that element while performing the algorithm 104. The height and width of each cell may then be acquired using the offsetHeight and offsetWidth HTML elements.

The values in column 118 may be used when generating DOM code to provide to browser 110. Such DOM code may be generated by a view that is operating in a model-view-controller arrangement like that described in more detail below. In particular, the view may be programmed with rules for converting the model of the spreadsheet 112 into HTML code that may be rendered into the DOM and displayed by the browser 110. For example, the view can execute formulas in cells in the model, and apply formatting to the cells and other similar actions. In addition, the view may generate a table feature in the DOM and assign row heights to the table using the values in column 118.

In order to determine when a row height may no longer be valid, but without having to re-compute the row height to do so each time a change is made to the model, a third column 120 is provided in the table 106. This third column indicates whether a particular row is dirty or not, meaning that observation of changes to the system indicates that the value for that row in column 118 can no longer be fully trusted. In particular, row height may be marked dirty if a determination is made that a substantive change to content in the spreadsheet has resulted in a change in content to a cell in that particular row. The row of column 120 is thus analogous to the use of dirty bits in microprocessor data flow and memory caching technologies, though in a wholly different field.

The determination to mark a row as dirty in column 120 may be implemented in a variety of ways. For example, in a simple form, a row may be marked dirty if any of its cells is pointed to, either directly or indirectly, by a cell that a user has edited. The determination may also be made by performing a limited analysis on the changes that have occurred by the editing of the cells, so as to determine whether those edits would result in greater or lesser content for a row, such that the row height might change. For example, if one of the values in rows one or two in spreadsheet 112 is changed, a computation may be made to determine the value for that column in row three. The system 100 may have previously saved a maximum value for any of the cells in the row and a minimum value for any of the cells in the row, and the new value for the change column may be compared to the maximum and minimum values. If it falls between the maximum and minimum values (and it was not the source of one of those values), presumably it will not change the row height, so that the corresponding bit in column 120 for that row can be maintained at zero, indicating that the row is not dirty. Alternatively, the particular cell in row three that falls under the edited cell in row one or two may be rendered in an off-screen space and, and if its rendered height after the editing or is equal to the current height of the row, the corresponding bit for that row in column 120 may be left at zero.

In the particular example shown here, an edit has been made to some cell in the second row since its height was last computed, so the dirty bit for row two has been set in this example. Looking at the data in row two however, it appears that the setting of the bit will not matter, because all of the cells are currently one line high even with the edit.

Additional techniques may be used to further increase the efficiency of determining appropriate heights to apply to rows in spreadsheet 112. For example, before marking a row as dirty in column 120, certain filtering steps may occur. For example, an edit that could not change the height of a row may be prevented from being forwarded for consideration in turning the row dirty. As one example, a change to the background color of a cell may be immediately discarded, as a change that is not one that would affect row height, and thus not one that would even be considered in determining whether to change a bit in column 120.

As another technique, the rendered HTML for each cell may be cached after it is generated in the hidden iFrame discussed above. That cache content may be used in a variety of ways, such as to build what is shown in viewport 114, and perform other analysis on the model and the view of the model. Such HTML may also be tracked in similar or different ways so as to indicate whether it is clean or dirty, and thus whether it needs to be regenerated or not in order for the system 100 to have confidence that it is accurate and up-to-date information.

As another mechanism for increasing efficiency of the techniques described here, the algorithm 104 may be set to generate HTML only for cells that have content in them. Empty cells generally will appear only at the model row height and not at a different rendered row height, and thus will not force the row height to increase in any manner. As a result, skipping the rendering of such rows, particularly when a spreadsheet is sparsely populated, may provide efficiency advantages for the techniques described here.

As another efficiency improving technique, row heights and row height measurement may be held up to enable batch measurement of the row heights. In particular, re-computation of row heights may wait until a number of rows that are marked dirty exceeds a predetermined number. The algorithm 104 may then be applied against those rows in one process, so as to save the browser from conducting unnecessary layouts on each row measurement.

Also, the local storage API for a browser may be employed to save cached row height measurements between browser sessions. In particular, The information shown in table 106 and perhaps additional information may be saved on the client device, such as in a cookie. In addition, a timestamp or other mechanism may be saved along with the row height information when a user exits a session of editing a particular spreadsheet such as spreadsheet 112. At that same time, the model of the spreadsheet may be saved to the server from which it was obtained, or recent changes may be provided to the server, and a timestamp may also be provided so that the time at which the particular user last edited the spreadsheet can be tracked. Thus, when that user next accesses is the spreadsheet from the server system, the server system may provide a timestamp back to the user's client device, and that timestamp can be compared to the timestamp in the row height cache. If the two timestamps match, the system 100 can determine that no changes have been made to the model since the particular user last accessed it, and the table 106 may be treated as having accurate and fresh values in it. As a result, the system 100 may allow a user's device to avoid having to unnecessarily make a first determination for appropriate row height in such a situation.

Thus, using these various techniques, accurate, efficient, and up-to-date knowledge of the row heights in a document may be determined quickly and relatively easily. As a result, a spreadsheet or other similar document may be displayed to a user in a pleasing and consistent manner such as by preventing row heights from jumping around and changing when the user scrolls through a spreadsheet. Such features may also be provided to a user without unnecessarily overburdening the user's computing device.

Figure 2A:
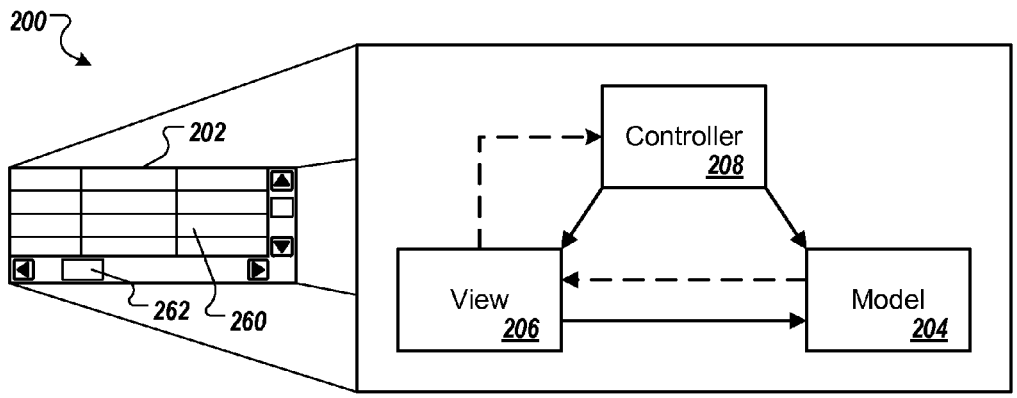
FIGS. 2A and 2B are block diagrams showing components of a model-view-controller implementation of a spreadsheet application.
Figure 2B:
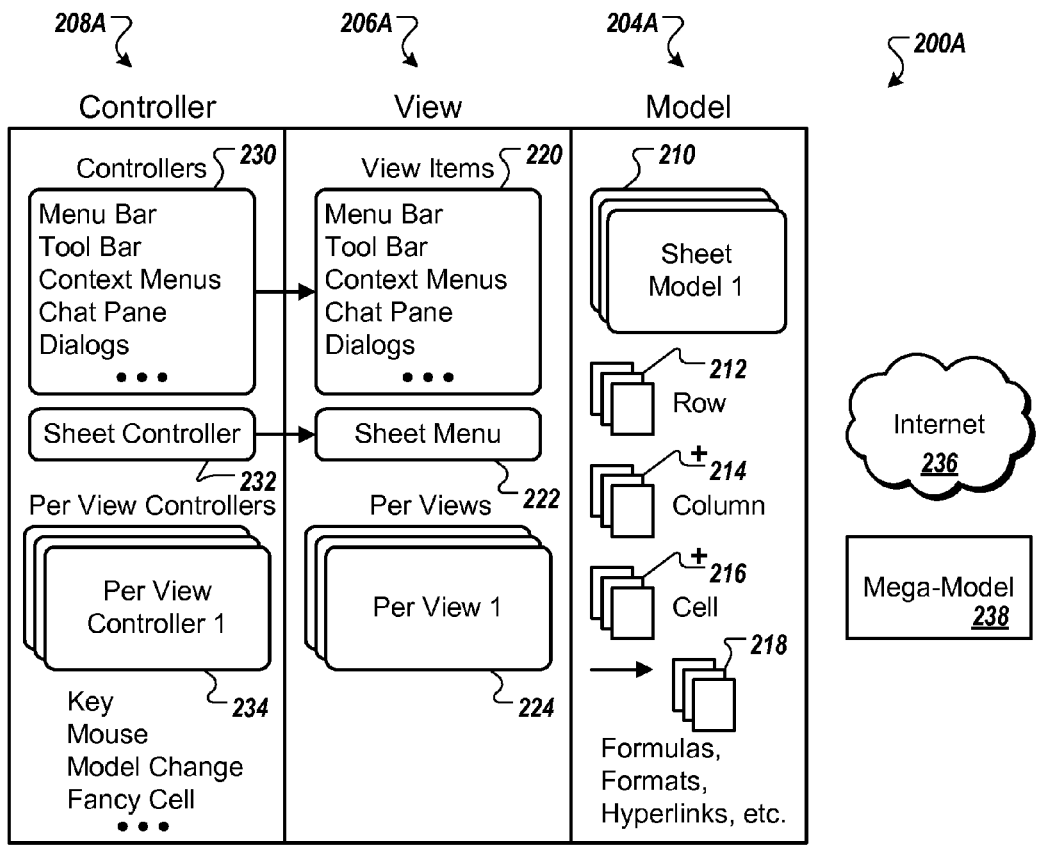

FIGS. 2A and 2B are block diagrams showing components of a model-view-controller (MVC) implementation of a spreadsheet application. For example, the spreadsheet application may be executed by a web browser, such as the web browser 102 shown in FIG. 1. In general, the MVC implementation provides for the download of a model from a remote server to a client, and the rendering of the client into a DOM to form a view of the model that may be managed directly by the web browser. The controller may intercept actions, such as clicks on icons and keystrokes on a keyboard, and may cause such actions to be implemented, such as by adding typed characters both to the model on the client and on the remote server.

Referring to FIG. 2A, a computer application 200 may be configured to display a spreadsheet document 202. The application 200 includes a model 204, a view 206, and a controller 208. For example, the model 204 can contain a representation of the state of the spreadsheet document 202, including such elements as values, formats, formulas, frozen columns, hidden columns, frozen rows, hidden rows, and the like. The view 206 can represent a rendering of the current state of the model 204. For example, the view 206 can be used for presenting to the user visual information that is associated with the spreadsheet document 202, such as user controls and spreadsheet data. The controller 208 can respond to changes in the model 204 or the view 206, and can update the state of the model 204 and the view 206. As shown in FIG. 2A, solid lines between the model 204, the view 206, and the controller 208 represent direct references between components, and dashed lines represent listeners. For example, listening for user interaction (e.g., provided by user controls) with the presentation of the view 206, the controller 208 can modify the model 204, and can in turn modify the view 206. As another example, listening for changes in the model 204 made by another user in a collaborative environment or changes made through an automated data update or another such process, the view 206 can request re-rendering of an updated model or portion of the model. For example, if a user of a client device is only one of multiple users concurrently editing a document, characters and other edits by the other users may be passed to the client device from the server system, and the client code may add characters to the model in near real-time, and those changes can be passed into the DOM—so that each user can see the edits made by the other users very quickly.

Referring to FIG. 2B, the model-view-controller implementation as presented in FIG. 2A is shown with additional detail. As shown, a computer application 200A includes a model 204A (corresponding with the model 204), a view 206A (corresponding with the view 206), and a controller 208A (corresponding with the controller 208).

The model 204A can include one or more sheet models 210. Each of the sheet models 210 can represent a separate spreadsheet in a collection of spreadsheet documents, for example, and can include a set of row models 212 and column models 214. For example, the row models 212 and the column models 214 can be represented as arrays. Each of the sheet models 210 can further include a set of cell models 216. For example, the cell models 216 can be represented as a sparsely populated two-dimensional array indexed by row and column ids. In some implementations, each of the sheet models 210 can include additional metadata, such as information related to frozen rows and columns, hidden rows and columns, merges, conditional formats, embedded object managers, maps of ids to positions, and the like.

Each of the cell models 216 can include a set of cell components 218. For example, each of the cell components 218 can include information such as cell types, raw values, display values, format models, formula models, hyperlinks, data validation, conditional formatting, mutation methods, and view annotations (e.g., properties that may be cached on cell objects for lookup). In some implementations, each cell type (e.g., text, hyperlink, comment, and the like) may include an associated renderer that may convert the cell to an HTML/DOM (HyperText Markup Language/Document Object Model) representation via rendering. Format models may include such properties as number formats, cell styling including colors and fonts, and the like. Formula models may also include formulas using R1C1 notation, and may include methods for formula conversion. Format models can be implemented using Cascading Style Sheet (CSS) classes, CSS class maps, and inline style objects, for example. Formula models can be stored in a map on a client device, for example, so that cells may share references to the formulas. In some implementations, format models may also be stored in a map on a client device. In some implementations, cell models and format models may follow the NULL object pattern. For example, shared singleton objects may exist for a default blank cell and for a default blank format. Model data and components may be provided by a mega-model 238 (whose name indicates that the model is a super-set of the other models or views) stored on a remote server system via a connection to a network 236 (e.g., the internet).

The view 206A can include one or more view items 220 that may enable the user to interact with the application 200, such as menu bars, tool bars, context menus, chat panes, dialogs, and the like. The view 206A can also include a sheet menu 222 that presents information and control options related to one or more of the sheet models 210, and one or more of a set of per views 224. For example, one of the per views 224 may be associated with a corresponding one of the sheet models 210. Each of the per views 224 may include components or controls such as freezebars, resizers, selectors, active cell indicators, and navigation tools (e.g., scrollbars and the like).

The controller 208A can include one or more controllers 230 that may listen for and handle user interactions with one or more of the view items 220. In some implementations, each of the controllers 230 may be associated with a corresponding one of the view items 220. For example, menu bar controllers may listen for and handle user interactions with menu bar view items (e.g., relating to various actions that a user would typically take from a row of menu selections), tool bar controllers may listen for and handle user interactions with tool bar view items, context menu controllers may listen for and handle user interactions with context menu view items, and so forth.

The controller 208A can also include a sheet controller 232 that may listen for and handle user interactions with the sheet menu 222. In addition, the controller 208A can include a set of per view controllers 234, where each of the controllers 234 is configured to listen for and handle user interactions with a corresponding view in the set of per views 224. Each of the per view controllers 234 may include various controller types, such as key controllers for intercepting and interpreting keyboard input, mouse controllers for intercepting and interpreting mouse input, and model change controllers for intercepting and interpreting model change events.

Generally, the controllers included in the controller 208A can transform user-generated events into model and view mutations. For example, based on a user action, a relevant controller (e.g., a controller configured for handling the action) may receive one or more events associated with the action and make transient changes to the view 206A before the user action is committed. Then, based on the event properties, the relevant controller can construct a command to mutate the model 204A, execute it, and send it to the remote server system that hosts the mega-model 238 via the network 236.

Many possible user interactions with the application 200A are possible, including interactions included in single-user sessions and in multiple-user sessions. For purposes of illustration, a series of example user interactions with the application 200A are described here. For example, to enter data into the spreadsheet document 202, the user may proceed by using a computer mouse to select a desired spreadsheet cell 260 by clicking on the cell. A mouse controller included in the per view controllers 234 (e.g., a per view controller associated with the active sheet of the document 202) can listen for an event associated with the mouse positioning input and the mouse click input, and upon intercepting it, can modify the view 206A (e.g., a per view associated with the active sheet) to provide the user with a visual indicator for the selection. For example, the selected spreadsheet cell 260 may be highlighted, assigned a different border, assigned a different color, or another such modification.

Using a keyboard, the user may enter a desired value into the spreadsheet cell 260. A keyboard controller included in the per view controllers 234 can listen for events associated with the keyboard input, and upon intercepting them, can modify the view 206A to provide the user with a visual indicator for the input. For example, as the user types data into the spreadsheet cell 260, the cell may be visually updated to present the data to the user. Additionally, the keyboard controller can modify the model 204A to include entered data by writing the user input to the model. For example, one of the cell models 216 (e.g., a cell model associated with the spreadsheet cell 260) can be updated to include the entered data as the raw value. Additionally, the mega-model 238 may be updated to include the entered data, thus coordinating the model 204A with the mega-model 238. For example, changes to the model 204A may be transmitted to the mega-model 238 via a connection to the network 236. In some implementations, changes may be sent periodically (e.g., once every second, once every 10 seconds, once every minute, or another appropriate time interval). In some implementations, changes may be sent based on user activity (e.g., removing focus from a spreadsheet cell, clicking a save button, or some other action).

Next, for example, the user may modify the formatting of data presented in the spreadsheet cell 260. By interacting with one of the view items 220 or with the sheet menu 222, the user can indicate a desired formatting change (e.g., a change such as changing regular numbers to currency, changing a font to bold, changing a color to blue, and the like). One of the controllers 230 or the sheet controller 232 can listen for user interaction with the view 206A, and upon detecting the interaction, can modify the model 204A to include the formatting change. For example, one of the cell models 216 (e.g., the cell model associated with the spreadsheet cell 260) can be updated to include the change. A model change controller included in the per view controllers 234 can listen for events associated with the model 204A and can send a request to the view 206A to update accordingly (e.g., by rendering a display value included in the cell model associated with the spreadsheet cell 260). In some implementations, the model change controller may also handle model change events that result from collaborative model changes.

Additionally, for example, the user may associate the spreadsheet cell 260 with a formula. Model-view-controller interactions within the application 200A for entering the formula and associating the formula with the spreadsheet cell 260 may be generally similar as when modifying formatting. For example, a model change controller included in the per view controllers 234 can detect the model change associated with the entered formula, and can send a request to the view 206A to perform a display update. As part of the display update, for example, the view 206A may convert the entered formula to a literal value, and may render the spreadsheet cell 260 to include the literal value.

Particular steps may be taken to permit a user to interact with a formula for a cell when the view might only include a literal value for the cell. In such a situation, a text entry area or box may be display adjacent to a viewport on a browser, and when a user places a cursor over a particular cell, the model data for the cell may be obtained and provided in the text entry area, while the literal value is shown in the cell in the viewport. As the user changes the formula, that change may be propagate to the model on the client (with changes to downstream cells) and may be rendered back into the DOM.

The user may also elect to view a different portion of the spreadsheet document 202 than they are currently viewing in the viewport. For example, by interacting with a scrollbar 206 that is associated with the spreadsheet document, the user may indicate a desire to view spreadsheet data beyond the current view. One of the per view controllers 234 (e.g., the per view controller associated with the active sheet) can listen for user interaction with the view 206A or other appropriate component (e.g., the visual portion of the scrollbar 262), and upon detecting the interaction (e.g., via a computer mouse), can request for the view 206A to redraw itself. If the user specifies a small amount of scrolling, the view 206A may cause itself to be displayed by the browser. For example, a buffer area of cells may be maintained in the model 204A around the cells displayed in the visible area of the spreadsheet document 202. If the amount of scrolling specified by the user is determined by the view 206A to be within the bounds of the buffer area of cells, the spreadsheet cells may be rendered using the cached data. If the user specifies a larger amount of scrolling, such that the scrolling specified by the user is determined by the view 206A to be outside of the bounds of the buffer area of cells, for example, additional spreadsheet data from the mega-model 238 may be downloaded via the network 236. Thus, the model 204A may be updated with information related to additional spreadsheet cells, and the spreadsheet cells may be rendered using the downloaded data.

Figure 2C:
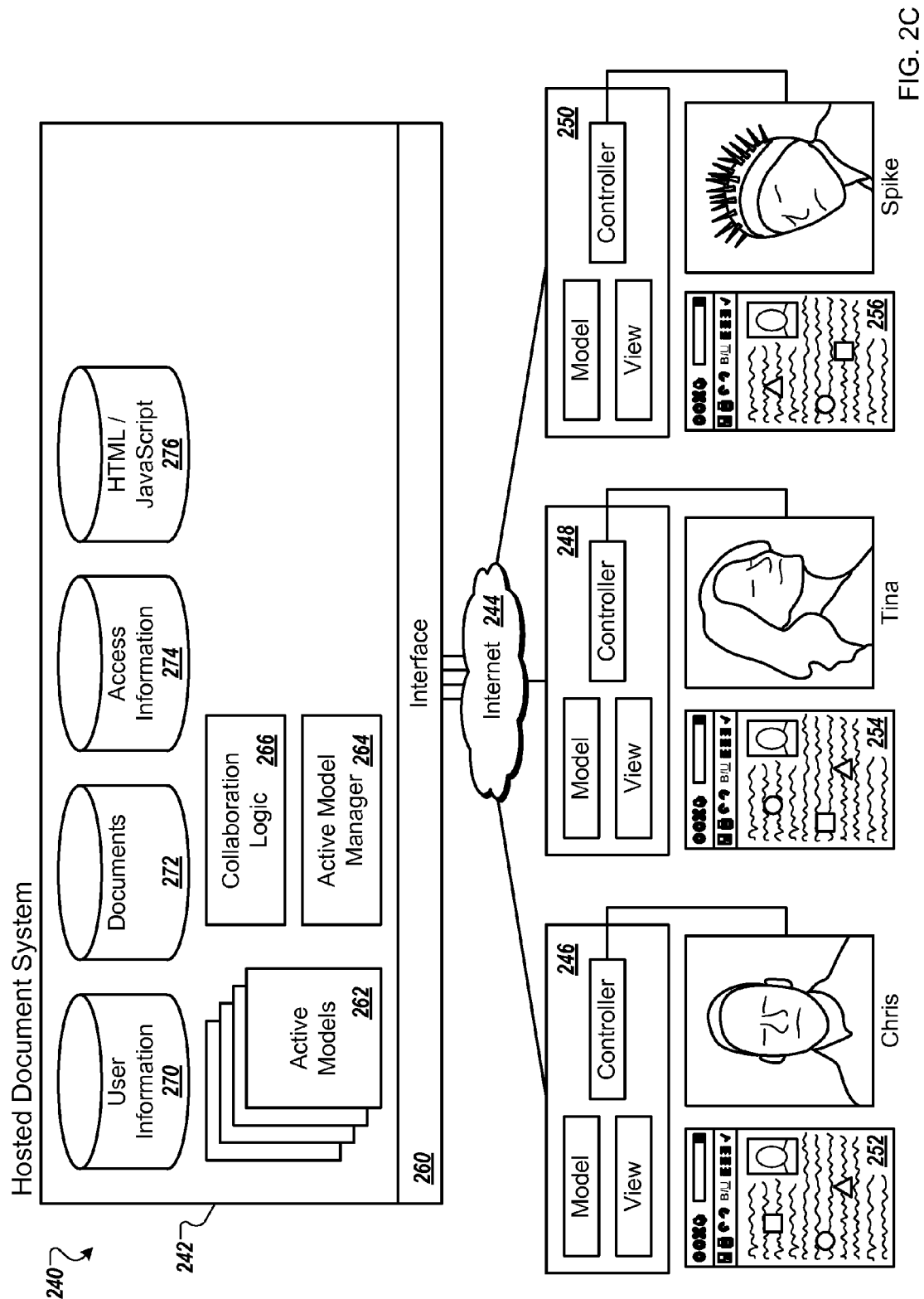
FIG. 2C is a block diagram of a system for permitting collaborative editing of a documented by multiple users through a hosted server system.

FIG. 2C is a block diagram of a system 240 for permitting collaborative editing of a document by multiple users through a hosted server system. In general, the system 240 includes a hosted document system 242 executed by one or more computer servers (e.g. a server farm). The hosted document system 242 can provide document hosting services to any number of client users via connections to a network 244 (e.g., the internet). Using the document system 242, client users may create new documents, modify existing documents, share documents, and collaboratively work on documents with other users.

For purposes of illustration, document hosting services may be provided to browser applications 246, 248, and 250. Each of the applications may be executed by a web browser (e.g., by the browser 104, as shown in FIG. 1), and may include model, view, and controller components (e.g., similar to the application 200, shown in FIGS. 2A and 2B). The applications 246, 248, and 250 may be configured to execute computer code (e.g., JavaScript and other code running in a web browser) to display a word processing interface and to perform word processing functions associated with one or more documents served by the hosted document system 242.

As shown in the present illustration, Chris can interact with a web browser 252, Tina can interact with a web browser 254, and Spike can interact with a web browser 256. Each of the browsers 252, 254, and 256 may access any appropriate number of browser applications (e.g., embedded applications, widgets, web services, and the like). For example, browser 252 can access application 246, browser 254 can access application 248, and browser 256 can access application 250.

By interacting with controls presented by the web browsers, for example, users of the system 240 (e.g., Chris, Spike, and Tina), can work with one or more documents that are managed and provided by the hosted document system 242. For example, the users may access existing documents provided by the system 242 or may create new documents. Each of the browser applications 246, 248, and 250 can communicate with an interface 260 of the document system 242 via the network 244. For example, communication between the browser applications 246, 248, and 250 and the interface 260 may include HTTP (HyperText Transfer Protocol) requests, SOAP (Simple Object Access Protocol) messages, or some other appropriate such protocol. In some implementations, client browsers may maintain browser channel connections to the interface 260 for communicating session data between clients and the document system 242.

The hosted document system 242 can include sub-components for storing and managing information related to system users, documents, and browser applications. The various sub-components may be executed by the same computer server, or may be distributed among multiple computer servers. The sub-components may communicate with each other directly (e.g., via messages, transferred files, shared data, remote procedure calls, or some other protocol) or indirectly (e.g., by communicating with an intermediary application). Generally, sub-components included in the document system 242 can communicate with client applications (e.g., the browser applications 246, 248, and 250) via the interface 260.

The system 242 can also include one or more data stores for storing user information 270. For example, the user information 270 can include information associated with system users (e.g., Chris, Tina, and Spike). Such information may include general user information and login information (e.g., user names, passwords, e-mail addresses, and the like), information related to one or more devices employed by the users to access the system (e.g., IP addresses, browser versions, connection speeds, and the like), and system usage information (e.g., access times, amount of data accessed, and the like), to name a few possibilities.

In some implementations, the system 242 can include one or more data stores for storing documents 272 in the form, e.g., of document models like those discussed above and below. For example, the documents 272 can include word processing documents created, maintained, and accessed by system users. As another example, the documents 272 may be generated by an automated process, such as a news feed or another reporting process that is based on gathered data. Information associated with the documents 272 can include document data models, document text, document formatting information, entities (e.g., tables, images, videos, sound clips, or other such objects), and the like.

The system 242 can also include one or more data stores for storing access information 274. For example, the access information 274 can include information that can be used for controlling access of system users (e.g., users included in the user information 270) to system documents (e.g., documents included in the documents 272). Generally, system users may set access privileges for documents that they create or manage. For example, Chris may create a personal letter document and specify the document as being private. Thus, other users of the system (e.g., Tina and Spike) may be unable to locate or access the document, which may have access control limitations applied to it in various familiar manners. As another example, Tina may upload a schedule document and specify the document as being shared and as being viewable by Chris. Thus, Spike may be unable to locate or access the document, but Chris may be able to access the document in view-only mode. In some implementations, Tina, as the document creator, may retain full access to the document, having privileges such as the ability to add, edit, and delete content, having the ability to change privileges, and having the ability to remove the document from the system 242. As another example, Spike may create a document related to a group project and specify Chris and Tina (and himself) as having full access privileges. In some implementations, user groups may be included in the access information 274. For example, a user may create a group and may add one or more users to the group. Rather than select individual users when assigning document permissions, in some instances, users may select a group including the users. The access information 274 may also include such information as the user ids of document users, document access times, and the like.

In some implementations, the system 242 can include one or more data stores for storing HTML/JavaScript 276. For example, the HTML/JavaScript 276 can include application code for executing the browser applications 246, 248, and 250. The application code may be provided to any of the browsers 252, 254, and 256, for example, when browser users access a web site associated with the hosted document system 242. Upon receiving a request for any of the documents 272, for example, the system 242 may provide the HTML/JavaScript 276 in addition to one or more of the documents 272. Using the HTML/JavaScript 276, the browser applications 246, 248, and 250 may render the document data and may provide an interface that enables browser users to interact with the documents. In some implementations, technologies other than HTML and JavaScript may be used for providing application code. For example, for web browsers including an appropriate plugin, another type of compiled or interpreted code may be provided.

Many possible user interactions with the system 240 are possible, including interactions in single user sessions and in multiple user sessions. For example, in a collaborative editing session, multiple users may simultaneously interact with a document. Although the applications used for editing the document may each behave independently, the applications may follow the same editing rules for updating and rendering the document model. Thus, multiple users may have similar experiences with the document, and may work together to produce a similar document model.

In an example session, to initiate collaborative word processing document editing, Chris accesses the hosted document system 242 by directing the web browser 252 to a web site (e.g., a domain) that is associated with the system 242. Receiving login information from the browser 252, the system 242 can verify Chris's information against the user information 270. Upon verification, the system 242 can provide HTML/JavaScript 276 to the browser 252 for executing an online word processor (though certain of the code may be passed before verification occurs). The browser can include a portion of the HTML/JavaScript 276 as the browser application 246, render chrome associated with the application, and display the application to Chris.

Chris may interact with the browser application 246 via a set of controls displayed in an application view within the browser 252. For example, Chris may indicate an intent to create a new document by clicking a button or selecting a menu option displayed in the application view. The application controller can intercept the command and pass the command to the interface 260 via the network 244. Receiving the command, the system 242 can add a new document to the documents 272, and add information associated with the new document to the set of active models 262. For example, the active models 262 may include model information associated with documents currently being edited by other users of the system 242.

A corresponding version of a model in the set of active models 262 may be present at the browser application 246. For example, Chris may add content and make changes to the word processing document provided by the view of the browser application 246, and the corresponding content and changes can be applied to a model that is accessed by the browser application 246 (and associated HTML and JavaScript code running in the browser), and may be propagated to the active models 262.

Chris may also share the document with one or more users. For example, using controls associated with the application 246, Chris may select Tina and Spike as users who may share the document, and he may assign both Tina and Spike full document privileges. For example, Tina and Spike may be included in a presented list of users commonly sharing documents with Chris, and Chris may select Tina and Spike from the list. As another example, Chris may provide the e-mail addresses of Tina and Spike. The system 242 can store the sharing information (e.g., user ids of other users having access to the document, permissions levels for the users, and the like) in the access information 274. In some implementations, the system 242 may send messages (e.g., e-mail, text messages, instant messages, and the like) to users who have received document privileges. In some implementations, users who have received document privileges may receive a link (e.g., a hyperlink or URL) to the shared document.

Upon receiving notification of the shared document, Tina and Spike may access the document using their web browsers 254, 256. For example, upon verification, the system 242 can provide HTML/JavaScript 276 to the browser 254, 256 for executing an online word processor. The browsers can include a portion of the HTML/JavaScript 276 as the browser applications 248, 250, can render chrome associated with the application, and can display the applications.

Additionally, an active model manager 264 included the hosted document system 242 can identify which documents are currently open by users of the system, and users who are active in the document (i.e., Chris), and can set up a collaborative session. For example, the active model manager 264 can determine that the document requested by Tina and by Spike is associated with one or more of the active models 262. The system 242 can then forward the document request to a computer hosting the document, and the computer can associate Tina and Spike with the current session. Additionally, the browser applications 248, 250 can download model data associated with the active model(s) 262, and render and display the downloaded model data. In some implementations, the system 242 can create model instances for Tina and for Spike and can add the instances to the active models 262.

In the present example, users may be able to view their own cursors as well as the cursors of other users in a collaborative session. For purposes of illustration, each user's cursor appears to himself/herself as a square. For example, Chris may view his own cursor as a square, and the other users' cursors as a circle or as a triangle. Correspondingly, Tina and Spike may also view their own cursor as a square, and the other users' cursors as circles or triangles. In some implementations, the cursors may appear as a different color (which could not be shown here). For example, cursors may generally appear as underlines or vertical bars, where the cursors are different colors for each user.

In the present example, changes made by each of the users can be sent by the browser applications 246, 248, and 250 to the hosted document system 242, coordinated, and sent back to the other users. In some implementations, the changes can be sent at time intervals (e.g., once every 100 milliseconds, once every 200 milliseconds, once every 500 milliseconds, once every second, once every 2 seconds, or another appropriate time interval). In some implementations, sending can be based at least in part on user activity or inactivity. For example, during periods of user inactivity, changes may be sent or received less frequently than during periods of user activity. When a user is entering data or when a local user hovers over a cursor for another user, a pop-up label that identifies the other user may be displayed, so that the local user can identify who is making changes—though the label may then disappear so that it does not continue to block the document.

To coordinate multiple document changes made by multiple users, for example, the hosted document system 242 can include collaboration logic 266. For example, the collaboration logic 266 can be executed by one or more code modules executed by one or more computer servers associated with the system 242. In some implementations, portions of the collaboration logic can be executed by the browser applications 246, 248, and 250. Generally, the logic 266 can resolve data collisions (e.g., instances where multiple users edit the same document portion or apply conflicting document formats) by applying a consistent set of rules to all user changes. Although, in some instances, one or more users may be prompted to disambiguate a change. For example, if Tina makes a document change and Spike makes a conflicting document change before receiving Tina's change, Spike may be presented with a message from the browser application 250 including possible conflict resolution scenarios. In some implementations, one user may be identified as trumping other users in collision situations. Chris, as the document creator, for example, may be able to apply his changes over changes made by either Tina or Spike in cases of conflict. For example, if Spike edits a passage at the same time as Chris deletes it, the passage (including Spike's edits) may be deleted.

Figure 3A:
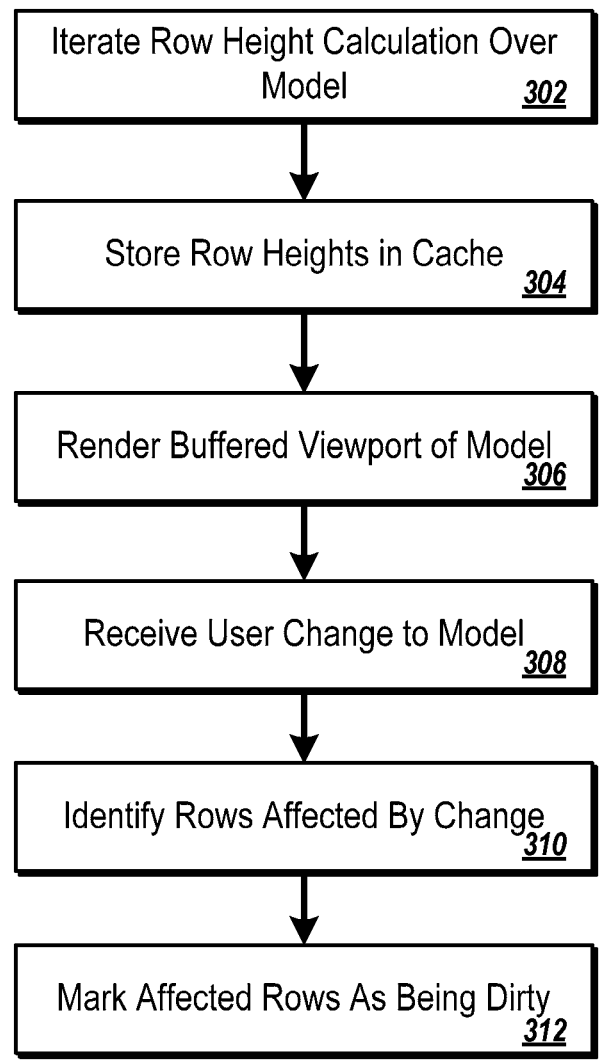
FIG. 3A is a flow chart of an example process for managing row heights in a browser-based spreadsheet application.

Thus, the system shown in FIG. 2C may handle collaborative editing of a hosted document by multiple users at one time. The management of such editing can involve a low amount of data passing between the various sub-systems in the system FIG. 3A is a flow chart of an example process for managing row heights in a browser-based spreadsheet application. In general, the process involves computing and storing row height information so that rose in a spreadsheet may be rendered efficiently yet accurately to a DOM model.

The process begins at box 302, where a row height calculation is iterated over a spreadsheet model, or a portion of a spreadsheet model. For example, an algorithm like algorithm 104 in FIG. 1 may be used to determine appropriate row heights for various rows in the model. At box 304, the row heights are stored in a cache, which may be organized similarly to the table 106 in FIG. 1.

A buffered viewport of the model is then rendered into a DOM to be accessed via a browser. The buffered viewport covers rows above and below, and columns to the left and right of, the literal viewport that may be currently seen by a user. Thus, as discussed above, as a result of providing rendering for a buffer area, a user may scroll slightly using the viewport without requiring additional rendering of content into the DOM.

At box 308, the system receives a user change to the model. For example, a user may paste some text into a cell in the model, or more appropriately into a view of the model. Alternatively, the user may change an input variable in a first cell for a formula that appears in a second cell, and other formulas may be depend on that latter cell. Thus, the change by the user may have downstream effects in various other cells.

Where the change may have affects in other cells, at box 310 rows that may be affected by the change are identified. Such a determination may be performed by identifying all cells that reference the changed cell, and then referencing all cells that reference the first level of referencing cells. Such a determination may continue until there are no more backward-pointing references in formulas. At box 312, the process marks rows that might be affected by the edits as being dirty rows. Such a change may be performed simply by flipping a dirty bit for a corresponding row in a table. As discussed above, a row may be considered dirty any time that it could possibly be affected by a change, or additional analysis may be performed to limit the instances in which a row is set as being dirty, and thereby to limit the number of unnecessary re-renderings of the row to determine its height, when the height is not actually changed. In any event, a dirty bit represents a determination that, under the rules being applied by the system, the value in the relevant memory cell can no longer be trusted to be accurate.

Figure 3B:
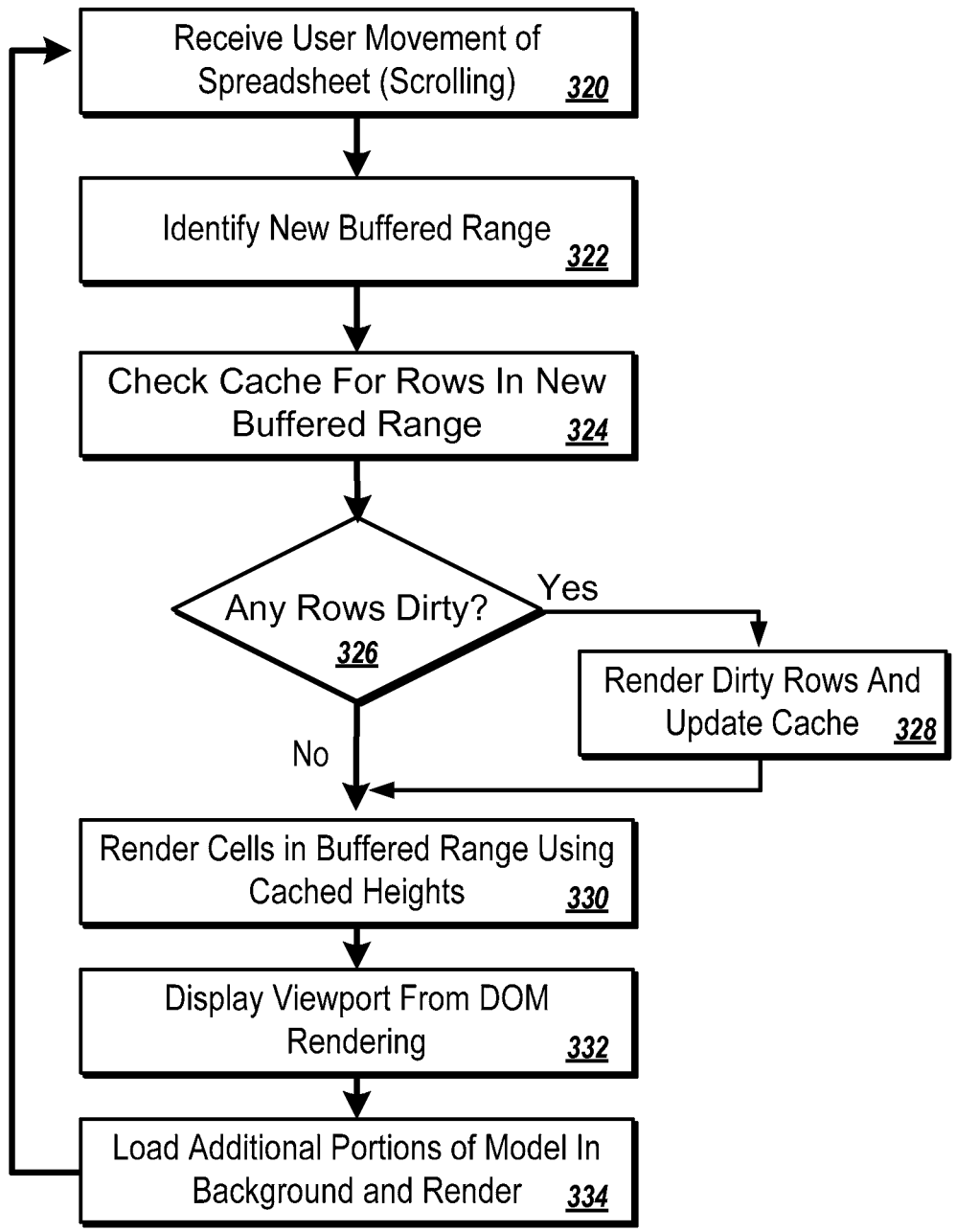
FIG. 3B is a flow chart of an example process for maintaining row height information when changes are made to a spreadsheet model.

FIG. 3B is a flow chart of an example process for maintaining row height information when changes are made to a spreadsheet model. In general, the process centers around operations that may occur when a user is editing cells within a spreadsheet and scrolling around in the spreadsheet, so that new renderings of the spreadsheet need to occur in a manner that ensures that appropriate row heights are being imposed or maintained.

The process begins at box 320, where a computing device receives a user movement of the spreadsheet, such as a scrolling movement imposed by the user grabbing a handle on a scrollbar and dragging it in one direction or another. The input may also take the form of a user pressing up/down or left/right arrow keys on a keyboard, though concerns about row height maybe relevant only when the user is scrolling up and down.

At box 324, the process checks a cache for rows in a new buffer range. In particular, as the scrolling occurs or when the scrolling is finished, the process may determine a location that is current for a viewport that will be displayed to a user, and may also determine an area around the viewport to provide a buffer of rendered cells in the area. Once the cells to be rendered are identified, the process may check to determine whether any rows for those cells have been marked dirty since they were previously rendered to a DOM or other appropriate mechanism. If any rows are dirty, they may be rendered, in manners discussed above, and the cache may be updated for the new determined row heights and also to indicate that they are no longer dirty, as at box 328.

If none of the relevant rows are dirty, or after dirty rows have been re-rendered, the process at box 330 may render the cells in the buffered ranged using the cached heights. In particular, a table may be formed in a DOM, and the rows in the table may be assigned heights that relate to the heights determined by the process here. At box 332, a viewport from the DOM that was rendered in box 330 may be displayed by a browser. Finally, in the background, additional information may be gathered and formed once the most-necessary information around a new viewport has been developed. For example, the buffered area around the viewport may be enlarged over time if a user does not make numerous additional changes in the area in the short-term. Such enlarging activities may include downloading additional portions of a model from a server system, performing row height calculations to the relevant rows in that model, and then rendering the rows into the DOM so that a user may scroll farther without having to have additional rendering performed. The amount of a table to be provided in the DOM may vary from case to case, and may depend on a DOM size that is determined to be sufficiently large to improve general performance of the process, but sufficiently small to not take up excess of memory on a computing device.

Figure 4:
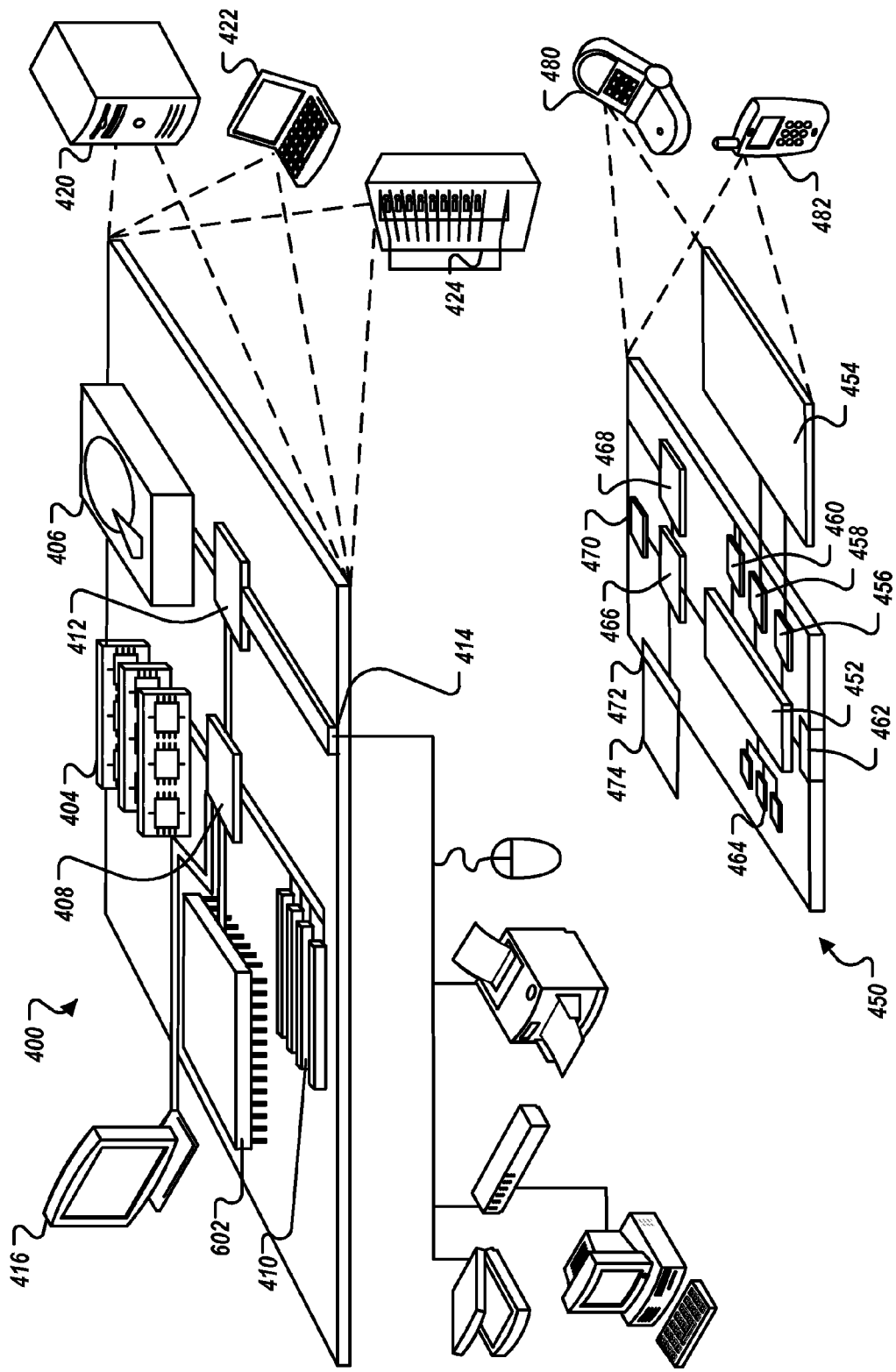
FIG. 4 shows an example of a computer device and a mobile computer device that can be used to implement the techniques described here.

FIG. 4 shows an example of a generic computer device 400 and a generic mobile computer device 450, which may be used with the techniques described here. Computing device 400 is intended to represent various forms of digital computers, such as laptops, desktops, workstations, personal digital assistants, servers, blade servers, mainframes, and other appropriate computers. Computing device 450 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

Computing device 400 includes a processor 402, memory 404, a storage device 406, a high-speed interface 408 connecting to memory 404 and high-speed expansion ports 410, and a low speed interface 412 connecting to low speed bus 414 and storage device 406. Each of the components 402, 404, 406, 408, 410, and 412, are interconnected using various busses, and may be mounted on a common motherboard or in other manners as appropriate. The processor 402 can process instructions for execution within the computing device 400, including instructions stored in the memory 404 or on the storage device 406 to display graphical information for a GUI on an external input/output device, such as display 416 coupled to high speed interface 408. In other implementations, multiple processors and/or multiple buses may be used, as appropriate, along with multiple memories and types of memory. Also, multiple computing devices 400 may be connected, with each device providing portions of the necessary operations (e.g., as a server bank, a group of blade servers, or a multi-processor system).

The memory 404 stores information within the computing device 400. In one implementation, the memory 404 is a volatile memory unit or units. In another implementation, the memory 404 is a non-volatile memory unit or units. The memory 404 may also be another form of computer-readable medium, such as a magnetic or optical disk.

The storage device 406 is capable of providing mass storage for the computing device 400. In one implementation, the storage device 406 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 404, the storage device 406, memory on processor 402, or a propagated signal.

The high speed controller 408 manages bandwidth-intensive operations for the computing device 400, while the low speed controller 412 manages lower bandwidth-intensive operations. Such allocation of functions is exemplary only. In one implementation, the high-speed controller 408 is coupled to memory 404, display 416 (e.g., through a graphics processor or accelerator), and to high-speed expansion ports 410, which may accept various expansion cards (not shown). In the implementation, low-speed controller 412 is coupled to storage device 406 and low-speed expansion port 414. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 400 may be implemented in a number of different forms, as shown in the figure. For example, it may be implemented as a standard server 420, or multiple times in a group of such servers. It may also be implemented as part of a rack server system 424. In addition, it may be implemented in a personal computer such as a laptop computer 422. Alternatively, components from computing device 400 may be combined with other components in a mobile device (not shown), such as device 450. Each of such devices may contain one or more of computing device 400, 450, and an entire system may be made up of multiple computing devices 400, 450 communicating with each other.

Computing device 450 includes a processor 452, memory 464, an input/output device such as a display 454, a communication interface 466, and a transceiver 468, among other components. The device 450 may also be provided with a storage device, such as a microdrive or other device, to provide additional storage. Each of the components 450, 452, 464, 454, 466, and 468, are interconnected using various buses, and several of the components may be mounted on a common motherboard or in other manners as appropriate.

The processor 452 can execute instructions within the computing device 450, including instructions stored in the memory 464. The processor may be implemented as a chipset of chips that include separate and multiple analog and digital processors. The processor may provide, for example, for coordination of the other components of the device 450, such as control of user interfaces, applications run by device 450, and wireless communication by device 450.

Processor 452 may communicate with a user through control interface 458 and display interface 456 coupled to a display 454. The display 454 may be, for example, a TFT LCD (Thin-Film-Transistor Liquid Crystal Display) or an OLED (Organic Light Emitting Diode) display, or other appropriate display technology. The display interface 456 may comprise appropriate circuitry for driving the display 454 to present graphical and other information to a user. The control interface 458 may receive commands from a user and convert them for submission to the processor 452. In addition, an external interface 462 may be provide in communication with processor 452, so as to enable near area communication of device 450 with other devices. External interface 462 may provide, for example, for wired communication in some implementations, or for wireless communication in other implementations, and multiple interfaces may also be used.

The memory 464 stores information within the computing device 450. The memory 464 can be implemented as one or more of a computer-readable medium or media, a volatile memory unit or units, or a non-volatile memory unit or units. Expansion memory 474 may also be provided and connected to device 450 through expansion interface 472, which may include, for example, a SIMM (Single In Line Memory Module) card interface. Such expansion memory 474 may provide extra storage space for device 450, or may also store applications or other information for device 450. Specifically, expansion memory 474 may include instructions to carry out or supplement the processes described above, and may include secure information also. Thus, for example, expansion memory 474 may be provide as a security module for device 450, and may be programmed with instructions that permit secure use of device 450. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 464, expansion memory 474, memory on processor 452, or a propagated signal that may be received, for example, over transceiver 468 or external interface 462.

Device 450 may communicate wirelessly through communication interface 466, which may include digital signal processing circuitry where necessary. Communication interface 466 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 468. In addition, short-range communication may occur, such as using a Bluetooth, WiFi, or other such transceiver (not shown). In addition, GPS (Global Positioning System) receiver module 470 may provide additional navigation- and location-related wireless data to device 450, which may be used as appropriate by applications running on device 450.

Device 450 may also communicate audibly using audio codec 460, which may receive spoken information from a user and convert it to usable digital information. Audio codec 460 may likewise generate audible sound for a user, such as through a speaker, e.g., in a handset of device 450. Such sound may include sound from voice telephone calls, may include recorded sound (e.g., voice messages, music files, etc.) and may also include sound generated by applications operating on device 450.

The computing device 450 may be implemented in a number of different forms, as shown in the figure. For example, it may be implemented as a cellular telephone 480. It may also be implemented as part of a smartphone 482, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the invention. For example, much of this document has been described with respect to particular types of documents and operations performed on such documents, but other types of documents and operations, and work outside of traditional web browsers may also be encompassed.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A computer-implemented method for managing row height in an electronic document, the method comprising:
   receiving, at a computing device, a request to display a portion of a document that defines a plurality of rows of content and that is represented by a document model, wherein the document comprises a spreadsheet made up of cells;
   determining heights of the plurality of rows and saving information about the heights in a cache that correlates rows to the information, wherein determining the heights of the plurality of rows comprises rendering selected cells in a hidden frame element and determining heights of the selected cells, wherein rendering selected cells in a hidden frame element further comprises inserting HyperText Markup Language associated with one or more of the selected cells into a span element in a hidden iFrame to acquire a height offset value; and
   using the document model and the cache to generate a view of the document model having the heights.

2. The computer-implemented method of claim 1, wherein the request to display the portion of the document comprises a scrolling input from a user viewing the document, and further comprising determining a view area around a current viewport being displayed to the user.

3. The computer-implemented method of claim 2, wherein at least part of the view area differs from a prior view area for the document.

4. The computer-implemented method of claim 1, wherein determining the heights of the plurality of rows comprises iteratively rendering cells across rows in the spreadsheet and storing a maximum determined cell height for each row in the cache.

5. The computer-implemented method of claim 1, further comprising skipping rendering of cells that are determined to be empty cells.

6. The computer-implemented method of claim 1, further comprising determining that changes have been made in the document, identifying one or more rows whose height could be affected by the changes, and marking the one or more rows in the cache as dirty, without immediately making a new determination of the heights of the one or more rows in the cache identified as dirty.

7. The computer-implemented method of claim 6, further comprising, after multiple instances of determining that changes have been made in the document, and associated marking of identified rows as dirty, identifying a batch of dirty rows, determining heights for each of the identified rows, and recording the heights for each of the identified rows in the cache.

8. The computer-implemented method of claim 1, further comprising saving information from the cache in a local storage that persists across sessions in a web-based application for interacting with the document.

9. A computer-implemented system for managing row height in an electronic document, the system comprising:
   a memory storing a document model that defines a document having a plurality of rows of data, wherein the document comprises a spreadsheet made up of cells;
   a row height measurement module that includes a document renderer for rendering portions of the data in individual rows of the document;
   a row height determination module to identify a row height for the portions by rendering selected cells in a hidden frame element and determining heights of the selected cells, wherein rendering selected cells in a hidden frame element further comprises inserting HyperText Markup Language associated with one or more of the selected cells into a span element in a hidden iFrame to acquire a height offset value; and
   a row height cache arranged to store values of row heights for the individual rows of the document, for use in rendering portions of the document to a browser-based application.

10. The computer-implemented system of claim 9, wherein the row height measurement module is responsive to scrolling inputs from users viewing a view of the document model, and is programmed to determine a view area around a current viewport being displayed to the user.

11. The computer-implemented system of claim 10, wherein at least part of the current viewport differs from a prior viewport for the document.

12. The computer-implemented system of claim 9, wherein the row height measurement module is programmed to determine heights of the plurality of rows by iteratively rendering cells across rows in the spreadsheet and storing a maximum determined cell height for each row in the cache.

13. The computer-implemented system of claim 9, wherein the system is further programmed to skip rendering of the cells that are determined to be empty cells.

14. The computer-implemented system of claim 9, wherein the system is further programmed to determine that changes have been made in the document, identify one or more rows whose height could be affected by the changes, and mark the one or more rows in the cache as dirty, without immediately making a new determination of the heights of the one or more rows in the row height cache identified as dirty.

15. The computer-implemented method of claim 14, wherein the system is further programmed to, after multiple instances of determining that changes have been made in the document, and associated marking of identified rows as dirty, identify a batch of dirty rows, determine heights for each of the identified rows, and record the heights in the row height cache for the identified rows.

16. The computer-implemented system of claim 9, further comprising a storage that stores information from the row height cache that persists across sessions with a web-based application for interacting with the document.

17. A computer-implemented system for managing row height in an electronic document, the system comprising:
a memory storing a document model that defines a document having a plurality of rows of data, wherein the document comprises a spreadsheet made up of cells;
means for determining heights of the plurality of rows in the document, wherein determining the heights of the plurality of rows comprises rendering selected cells in a hidden frame element and determining heights of the selected cells, wherein rendering selected cells in a hidden frame element further comprises inserting HyperText Markup Language associated with one or more of the selected cells into a span element in a hidden iFrame to acquire a height offset value; and
means for using the heights to rendering portions of the document to a browser-based application.

18. A non-transitory computer-readable storage medium storing instructions that, when executed by a processor cause the processor to perform operations comprising:
receiving a request to display a portion of a document that defines a plurality of rows of content and that is represented by a document model, wherein the document comprises a spreadsheet made up of cells;
determining heights of the plurality of rows and saving information about the heights in a cache that correlates rows to the information, wherein determining the heights of the plurality of rows comprises rendering selected cells in a hidden frame element and determining heights of the selected cells, wherein rendering selected cells in a hidden frame element further comprises inserting HyperText Markup Language associated with one or more of the selected cells into a span element in a hidden iFrame to acquire a height offset value; and
using the document model and the cache to generate a view of the document model having the heights.

* * * * *